(12) United States Patent
Kusumoto et al.

(10) Patent No.: US 8,975,354 B2
(45) Date of Patent: Mar. 10, 2015

(54) POLYPROPYLENE RESIN COMPOSITION

(75) Inventors: Tatsuya Kusumoto, Chiba (JP); Yoshio Sugimoto, Bangkok (TH); Mitsuru Fujisawa, Ichihara (JP)

(73) Assignee: Prime Polymer Co., Ltd., Tokyo (JP)

( * ) Notice: Subject to any disclaimer, the term of this patent is extended or adjusted under 35 U.S.C. 154(b) by 0 days.

(21) Appl. No.: 13/978,844

(22) PCT Filed: Jan. 27, 2012

(86) PCT No.: PCT/JP2012/000512
§ 371 (c)(1),
(2), (4) Date: Sep. 26, 2013

(87) PCT Pub. No.: WO2012/102050
PCT Pub. Date: Aug. 2, 2012

(65) Prior Publication Data
US 2014/0018478 A1    Jan. 16, 2014

(30) Foreign Application Priority Data

Jan. 27, 2011   (JP) .................................. 2011-015293

(51) Int. Cl.
*C08F 110/04*   (2006.01)

(52) U.S. Cl.
USPC .......................................... 526/351; 525/240

(58) Field of Classification Search
CPC ...... C08L 53/00; C08F 110/00; C08F 210/00; C08F 10/00
USPC .......................................... 526/351; 525/240
See application file for complete search history.

(56) References Cited

U.S. PATENT DOCUMENTS

| 7,718,735 | B2 | 5/2010 | Kanzaki |
| 2004/0044107 | A1* | 3/2004 | Kikuchi et al. ............... 524/186 |
| 2006/0160942 | A1 | 7/2006 | Kanzaki |
| 2007/0010622 | A1 | 1/2007 | Naito et al. |
| 2010/0210780 | A1 | 8/2010 | Sugimoto |
| 2010/0311894 | A1 | 12/2010 | Tsukahara et al. |

FOREIGN PATENT DOCUMENTS

| JP | 2000-143904 | 5/2000 |
| JP | 2004/359877 | 12/2004 |
| JP | 2005-146013 | 6/2005 |
| JP | 2006-193644 | 7/2006 |
| JP | 2008-019347 | 1/2008 |
| JP | 2009-046691 | 3/2009 |
| JP | 2009-79117 | 4/2009 |
| JP | 2009-155627 | 7/2009 |
| JP | 2010-537039 | 12/2010 |
| WO | WO 2009/060738 A1 | 5/2009 |

OTHER PUBLICATIONS

International Preliminary Report on Patentability PCT/JP2012/000512 dated Jul. 30, 2013.
International Search Report PCT/JP2012/000512 dated Apr. 17, 2012.

* cited by examiner

*Primary Examiner* — Robert D. Harlan
(74) *Attorney, Agent, or Firm* — Foley & Lardner LLP

(57) ABSTRACT

A polypropylene-based resin composition including 100 parts by weight of the following component (A), 18 parts by weight or more and 65 parts by weight or less of the following component (B), 6 parts by weight or more and 45 parts by weight or less of the following component (C), 25 parts by weight or more and 60 parts by weight or less of the following component (D), 0.1 part by weight or more and 6.5 parts by weight or less of the following component (E) and 0.15 part by weight or more and 5.0 parts or less by weight of the following component (F):

(A) a specific propylene-ethylene block copolymer A:
(B) a specific propylene-ethylene block copolymer B:
(C) an ethylene-α-olefin copolymer having a melt flow rate (230° C., under the load of 2.16 kg) of 0.5 g/10 min or more and 20 g/10 min or less;
(D) an inorganic filler having an average particle diameter of 1 μm or more and 14 μm or less;
(E) an acid-modified polypropylene; and
(F) a lubricant.

12 Claims, No Drawings

POLYPROPYLENE RESIN COMPOSITION

TECHNICAL FIELD

The invention relates to a polypropylene-based resin composition. More particularly, the invention relates to a resin composition which is capable of producing a molded product which has excellent mechanical properties, hardly suffers generation of flow marks or the like to have good appearance, has excellent low gloss property and scratch resistance.

BACKGROUND ART

In the interior parts of an automobile formed of a resin molded product, in many cases, a molded product is normally used after being subjected to a post treatment such as coating and lamination of outer layers in order to improve scratch resistance, low gloss property (improving low gloss property is aimed at imparting a molded product with high grade sense or suppressing reflection from the background to the window glass in respect of safety), and to conceal the inferior appearance such as flow marks. Therefore, excellent economy of a resin molded product has not been fully exhibited.

As the material which has excellent scratch resistance, low gloss property and an appearance having a small amount of flow marks, Patent Document 1 discloses a polypropylene-based resin composition. However, this resin composition was insufficient in low gloss property. In addition, due to the use of a high-molecular ethylene α-olefin diene copolymer, this resin composition has poor dispersibility, and hence, paint coat particles are likely to generate on the surface of a molded product. Further, there was a problem that the raw material cost was increased when an ethylene α-olefin diene copolymer is used.

Patent Document 2 discloses a polypropylene-based resin composition with a good appearance having invisible weld or the like having well-balanced rigidity and impact resistance. However, the [η] (tetralin, 135° C.) of an EPR part of block polypropylene used in base polypropylene is 4 to 5.5 (dl/g) and hence, a swell is not generated sufficiently. Therefore, when a resin is injected in a mold, the appearance of a molded product becomes poor due to unstable adhesion of a mold and a resin.

Patent Document 3 discloses a propylene resin composition which has excellent moldability and is capable of forming a molded product with a good appearance (appearance having only a small amount of flow marks, texture). However, this propylene resin composition does not provide sufficient excellent mechanical properties.

Patent Document 4 discloses a propylene resin composition having excellent moldability. In particular, it discloses a propylene resin composition capable of producing a molded product by injection molding which hardly suffers generation of flow marks, exhibits good low gloss property and in which welds are hardly generated. However, this resin composition did not have sufficient scratch resistance.

Patent Document 5 discloses a propylene resin composition which has well-balanced mechanical properties. This resin composition does not have sufficient scratch resistance. In addition, the [η] of an EPR part of block polypropylene used in base polypropylene is relatively high, there is a problem that paint coat particles are likely to generate on the surface of a molded product.

RELATED ART DOCUMENTS

Patent Documents

Patent Document 1: JP-A-2009-079117
Patent Document 2: JP-A-2006-193644
Patent Document 3: JP-A-2009-155627
Patent Document 4: JP-A-2000-143904
Patent Document 5: JP-A-2005-146013

SUMMARY OF THE INVENTION

An object of the invention is to provide a polypropylene-based resin composition which has excellent mechanical properties, suffers only a small amount of flow marks, and has excellent low gloss property and scratch resistance.

According to the invention, the following polypropylene-based resin composition or the like are provided.

1. A polypropylene-based resin composition comprising 100 parts by weight of the following component (A), 18 parts by weight or more and 65 parts by weight or less of the following component (B), 6 parts by weight or more and 45 parts by weight or less of the following component (C), 25 parts by weight or more and 60 parts by weight or less of the following component (D), 0.1 part by weight or more and 6.5 parts by weight or less of the following component (E) and 0.15 part by weight or more and 5.0 parts by weight or less of the following component (F):
(A) a propylene-ethylene block copolymer A satisfying the following (a1) to (d1):
(a1) the amount of a room temperature decane-soluble part is 8 wt % or more and 35 wt % or less;
(b1) the room temperature decane-soluble part has a limiting viscosity [η] of 1.0 dl/g or more and 10.0 dl/g or less;
(c1) the amount of ethylene in the room temperature decane-soluble part is 33 mol % or more and 48 mol % or less;
(d1) the melt flow rate (MFR: 230° C., under the load of 2.16 kg) is 20 g/10 min or more and 100 g/10 min or less;
(B) A propylene-ethylene block copolymer B satisfying the following (a2) to (d2):
(a2) the amount of a room temperature decane-soluble part is 16 wt % or more and 35 wt % or less;
(b2) the room temperature decane-soluble part has a limiting viscosity [η] of 5.0 dl/g or more and 10.0 dl/g or less;
(c2) the amount of ethylene in the room temperature decane-soluble part is 36 mol % or more and 49 mol % or less;
(d2) the melt flow rate (MFR: 230° C., under the load of 2.16 kg) is 1 g/10 min or more and less than 20 g/10 min;
(C) an ethylene-α-olefin copolymer having a melt flow rate (230° C., under the load of 2.16 kg) of 0.5 g/10 min or more and 20 g/10 min or less;
(D) an inorganic filler having an average particle diameter of 1 μm or more and 14 μm or less;
(E) an acid-modified polypropylene; and
(F) a lubricant 2. The polypropylene-based resin composition according to 1, wherein the amount of the room temperature decane-soluble part of the component (A) is 9 wt % or more and 28 wt % or less.

3. The polypropylene-based resin composition according to 1 or 2, wherein (b1) the room temperature decane-soluble part of the component (A) has a limiting viscosity [η] of 2.0 dl/g or more and 8.5 dl/g or less.

4. The polypropylene-based resin composition according to any of 1 to 3, wherein the amount of the component (B) is 20 parts by weight or more and 50 parts by weight or less.

5. The polypropylene-based resin composition according to any of 1 to 4, wherein (b2) the room temperature decane-soluble part of the component (B) has a limiting viscosity [η] of 6.5 dl/g or more and 8.5 dl/g or less.

6. The polypropylene-based resin composition according to any of 1 to 5, wherein the melt flow rate (230° C., under the load of 2.16 kg) of the component (A) is 25 g/10 min or more and 95 g/10 min or less.
7. The polypropylene-based resin composition according to any of 1 to 6, wherein the melt flow rate (230° C., under the load of 2.16 kg) of the component (B) is 10 g/10 min or more and 18 g/10 min or less.
8. The polypropylene-based resin composition according to any of 1 to 7, wherein the melt flow rate (230° C., under the load of 2.16 kg) is 10 g/10 min or more and 45 g/10 min or less.
9. The polypropylene-based resin composition according to any of 1 to 8, wherein the inorganic filler (D) is talc.
10. The polypropylene-based resin composition according to any of 1 to 9, wherein the lubricant (F) is an aliphatic acid amide.
11. A molded product obtained by molding the polypropylene-based resin composition according to any of 1 to 10.
12. The molded product according to 11 which is used for an instrumental panel of an automobile.

According to the polypropylene-based resin composition of the invention, it is possible to obtain a molded product which has excellent mechanical property, hardly suffers generation of flow marks and has excellent low gloss property and scratch resistance.

MODE FOR CARRY OUT THE INVENTION

The propylene-based resin composition comprises the following components (A) to (F):
(A) a propylene-ethylene block copolymer A: 100 parts by weight
(B) a propylene-ethylene block copolymer B: 18 parts by weight or more and 65 parts by weight or less
(C) an ethylene-α-olefin copolymer having a melt flow rate (230° C., under the load of 2.16 kg) of 0.5 g/10 min or more and 20 g/10 min or less: 6 parts by weight or more and 45 parts by weight or less
(D) an inorganic filler having an average particle diameter of 1 μm or more and 14 μm or less: 25 parts by weight or more and 60 parts by weight or less
(E) an acid-modified polypropylene: 0.1 parts by weight or more and 6.5 parts by weight or less
(F) a lubricant: 0.15 part by weight or more and 5.0 parts by weight or less Due to the presence of the following components (A) to (F) in a prescribed amount, it is possible to obtain a molded product which hardly suffers flow marks or the like and has excellent low gloss property and scratch resistance.

Each component will be explained hereinbelow.
(A) Component (A)

The propylene-ethylene block copolymer A as the component (A) satisfies the following conditions (a1) to (d1):
(a1) the amount of the room temperature decane-soluble part is 8 wt % or more and 35 wt % or less
(b1) the room temperature decane-soluble part has a limiting viscosity [η] of 1.0 dl/g or more and 10.0 dl/g or less
(c1) the amount of ethylene in the room temperature decane-soluble part is 33 mol % or more and 48 mol % or less
(d1) the melt flow rate (MFR: 230° C., under the load of 2.16 kg) is 20 g/10 min or more and 100 g/10 min or less Regarding (a1) mentioned above, the amount of the room temperature decane-soluble part of the propylene-ethylene block copolymer A used in the invention is 8 wt % or more and 35 wt % or less, preferably 8 wt % or more and 28 wt % or less. It may be 16 wt % or more and 35 wt % or less or 17 wt % or more and 28 wt % or less.

If the amount of the room temperature decane-soluble part is less than 8 wt %, the impact resistance of the resulting molded product may be insufficient. On the other hand, if the amount of the room temperature decane-soluble part exceeds 35 wt %, the modulus of elongation is lowered.

Regarding (b1), the limiting viscosity [η] of the room temperature decane-soluble part of the propylene-block copolymer A is 1.0 dl/g or more and 10.0 dl/g or less, preferably 2.0 dl/g or more and 8.5 dl/g or less. It may be 1.0 dl/g or more and 4.5 dl/g or less or 1.5 dl/g or more and 3.5 dl/g or less.

If the limiting viscosity [η] is less than 1.0 dl/g, it is impossible to obtain an intended impact strength. On the other hand, if the limiting viscosity [η] exceeds 10.0 dl/g, paint coat particles may be generated in a molded product due to lowering of resin fluidity or tendency of being mixed with other resins, the appearance may be deteriorated or mechanical properties may be lowered.

Regarding (c1), the amount of ethylene in the room temperature decane-soluble part of the propylene-ethylene block copolymer A is 33 mol % or more and 48 mol % or less, preferably 37 mol % or more and 43 mol % or less. If the amount of ethylene in the room temperature decane-soluble part is less than 33 mol %, glossiness of the molded product may be increased glossiness. If the amount of ethylene exceeds 48 mol %, impact resistance may be lowered.

Regarding (d1), the MFR of the propylene-ethylene block copolymer A is 20 g/10 min or more and 100 g/10 min or less, preferably 25 g/10 min or more and 95 g/10 min or less. If the melt flow rate is less than 20 g/10 min, resin fluidity is lowered, causing molding to be difficult. On the other hand, if the melt flow rate exceeds 100 g/10 min, impact strength is lowered.

The propylene-ethylene block copolymer A may be used singly or in combination of two or more copolymers. For example, two copolymers may be mixed in order to adjust the MFR.

(B) Propylene-Ethylene Block Copolymer (B)

The propylene-ethylene block copolymer (B) satisfies the following conditions (a2) to (d2).
(a2) the amount of the room temperature decane-soluble part: 16 wt % or more and 35 wt % or less.
(b2) the limiting viscosity [η] of the room temperature decane-soluble part is 5.0 dl/g or more and 10.0 dl/g or less
(c2) the amount of ethylene in the room temperature decane-soluble part is 36 mol % or more and 49 mol % or less
(d2) MFR (230° C., under the load of 2.16 kg) is 1 g/10 min or more and less than 20 g/10 min Regarding (a2), the amount of the room temperature decane-soluble part of the propylene-ethylene block copolymer B is 16 wt % or more and 35 wt % or less, preferably 17 wt % or more and 28 wt % or less. If the amount of the decane-soluble part is less than 16 wt %, the impact strength may be lowered. Further, the starting point of flow mark generation becomes short, leading to poor molded product appearance. In addition, glossiness may be increased. On the other hand, if the amount of the decane-soluble part exceeds 35 wt %, the resin fluidity may be lowered, thereby causing moldability to be deteriorated.

Regarding (b2), the limiting viscosity [η] of the decane-soluble part of the propylene-ethylene block copolymer B is 5.0 dl/g or more and 10.0 dl/g or less, preferably 6.5 dl/g or more and 8.5 dl/g or less. If the liming viscosity [η] is less than 5.0 dl/g, the starting point of flow mark generation becomes short, leading to poor molded product appearance.

In addition, glossiness may be increased. If the limiting viscosity [η] exceeds 10.0 dl/g, paint coat particles may be generated in a molded product due to lowering of resin fluidity or tendency of being mixed with other resins, thereby to deteriorate the appearance.

Regarding (c2), the amount of ethylene in the room temperature decane-soluble part of the propylene-ethylene block copolymer B is 36 mol % or more and 49 mol % or less, preferably 39 mol % or more and 44 mol % or less. If the amount of ethylene in the room temperature decane-soluble part of the propylene-ethylene block copolymer is less than 36 mol %, glossiness is increased. If the amount of ethylene in the room temperature decane-soluble part exceeds 49 mol %, paint coat particles are generated on the surface of a molded product due to poor dispersion of rubber, leading to deterioration of the appearance.

Regarding (d2), the MFR of the propylene-ethylene block copolymer B is 1 g/10 min or more and less than 20 g/10 min, preferably 10 g/10 min or more and 18 g/10 min or less. If the MFR is less than 1 g/10 min, the resin fluidity is lowered, causing moldability to be lowered. On the other hand, if the MFR is 20 g/10 min or more, impact resistance may be lowered.

The amount of the propylene-ethylene block copolymer B is 18 parts by weight or more and 65 parts by weight or less relative to 100 parts by weight of the above-mentioned component (A), preferably 20 parts by weight or more and 50 parts by weight or less. If the amount of the copolymer B is less than 18 parts by weight, the starting point of flow mark generation becomes short, leading to poor molded product appearance. In addition, glossiness of the molded product may be increased. If the amount exceeds 65 parts by weight, the resin fluidity may be lowered, leading to poor moldability. Further, a large amount of coat paint particles are formed on the surface of a molded product, thereby leading to deterioration of the appearance.

The propylene-ethylene block copolymers A and B used in the invention can be produced by polymerizing propylene by using a catalyst for olefin polymerization comprising a solid titanium catalyst component (I) mentioned below and an organic metal compound catalyst component (II), followed by copolymerization of propylene and ethylene. Hereinbelow, an explanation will be made on the catalyst component and the polymerization method.

[Solid Titanium Catalyst Component (I)]

The solid titanium catalyst component (I) comprises titanium, magnesium, halogen and, if necessary, an electron donar. As the solid titanium catalyst (I), a known solid titanium catalyst component can be used without restrictions. One example of the method for producing the solid titanium catalyst component (I) will be mentioned below.

In many cases, a magnesium compound and a titanium compound are used for preparing the solid titanium catalyst component (I).

As specific examples of the magnesium compound, known magnesium compounds such as magnesium halide such as magnesium chloride and magnesium bromide; an alkoxymagnesium halide such as magnesium methoxychloride, magnesium ethoxychloride and magnesium phenoxychloride; an alkoxy magnesium such as ethoxy magnesium, isopropoxy magnesium, butoxy magnesium, and 2-ethylhexoxy magnesium; aryloxy magnesium such as phenoxy magnesium; and a carboxylate of magnesium such as magnesium stearate can be given.

These magnesium compounds may be used singly or in combination of two or more. These magnesium compounds may be a complex compound or double compound with other metals or may be a mixture with other metal compounds.

Of these, a magnesium compound containing a halogen is preferable. Magnesium halide, in particular, magnesium chloride, is preferably used. In addition, alkoxy magnesium such as ethoxy magnesium is preferably used.

The magnesium compound may be one which is derived from other materials. For example, it may be one which can be obtained by allowing an organic magnesium compound such as a Grignard reagent to contact titanium halide, silicon halide, alcohol halide or the like.

As the titanium compound, a tetravalent titanium compound represented by the following formula can be given.

Ti(OR)$_g$X$_{4-g}$ wherein R is a hydrocarbon group, X is a halogen atom and g is 0≤g≤4.

More specifically, titanium tetrahalide such as TiCl$_4$ and TiBr$_4$; alkoxytitanium trihalide such as Ti(OCH$_3$)Cl$_3$, Ti(OC$_2$H$_5$)Cl$_3$, Ti(O-n-C$_4$H$_9$)Cl$_3$, Ti(OC$_2$H$_5$)Br$_3$ and Ti(O-isoC$_4$H$_9$)Br$_3$; alkoxytitanium dihalide such as Ti(OCH$_3$)$_2$Cl$_2$ and Ti(OC$_2$H$_5$)$_2$Cl$_2$; alkoxytitanium monohalide such as Ti(OCH$_3$)$_3$Cl, Ti(O-n-C$_4$H$_9$)$_3$Cl and Ti(OC$_2$H$_5$)$_3$Br; tetraalkoxy titanium such as Ti(OCH$_3$)$_4$, Ti(OC$_2$H$_5$)$_4$, Ti(OC$_4$H$_9$)$_4$ and Ti(O-2-ethylhexyl)$_4$.

Of these, titanium tetrahalide is preferable. In particular, titanium tetrachloride is preferable. These titanium compounds may be used singly or in combination of two or more.

As the magnesium compound and the titanium compound as mentioned above, compounds disclosed in JP-A-S57-63310, JP-A-H05-170843 or the like can be given.

As the preferable specific example of the preparation method of the solid titanium catalyst component (I) used in the invention, the following methods (P-1) to (P-4) can be given.

(P-1) A method in which a solid adduct composed of a magnesium compound and an electron-donor component (a) such as alcohol, an electron-donor component (b), which is mentioned later, and a titanium compound in the liquid state are allowed to contact in the suspension state in the co-presence of an inactive hydrocarbon solvent in a divided manner.

(P-2) A method in which a solid adduct composed of a magnesium compound and an electron-donor component (a), an electron-donor component (b) and a titanium compound in the liquid state are allowed to contact with each other in a divided manner.

(P-3) A method in which a solid adduct composed of a magnesium compound and an electron-donor component (a), an electron-donor component (b) and a titanium compound in the liquid state are allowed to contact with each other in the suspension state in the co-presence of an inert hydrocarbon solvent.

(P-4) A magnesium compound in the liquid state composed of a magnesium compound and an electron-donor component (a), a titanium compound in the liquid state and an electron-donor component (b) are allowed to contact with each other.

The preferable reaction temperature is −30° C. to 150° C., more preferably −25° C. to 130° C., with −25° C. to 120° C. being further preferable.

The production of the above-mentioned solid titanium catalyst component can be conducted in the presence of a known medium, according to need. As examples of such medium, an aromatic hydrocarbon having a slight degree of polarity such as toluene, a known aliphatic hydrocarbon such as heptane, octane, decane and cyclohexane, and an alicyclic hydrocarbon compound can be given. Of these, an aliphatic hydrocarbon is preferable.

As the electron-donor component (a) used for the formation of the solid adduct or the liquid-state magnesium compound, a known compound which can allow the above-mentioned magnesium compound to be soluble in a temperature range from room temperature to about 300° C. For example, an alcohol, an aldehyde, an amine, a carboxylic acid, a mixture of these or the like are preferable. As examples of such compound, compounds stated in detail in JP-A-S57-63310 and JP-A-H05-170843 can be given.

As specific examples of alcohol capable of dissolving the above-mentioned magnesium compound, aliphatic alcohol such as methanol, ethanol, propanol, butanol, isobutanol, ethylene glycol, 2-methylpentanol, 2-ethylbutanol, n-heptanol, n-octanol, 2-ethylhexanol, decanol and dodecanol; alicyclic alcohol such as cyclohexanol and methylcyclohexanol, aromatic alcohol such as benzyl alcohol and methylbenzyl alcohol; and aliphatic alcohol having an alkoxy group such as n-butyl cellosolve can be given.

As the carboxylic acid, an organic carboxylic acid having 7 or more carbon atoms such as caprylic acid and 2-ethylhexanoic acid can be given. As the aldehyde, an aldehyde having 7 or more carbon atoms such as caprylic aldehyde and 2-ethylhexylaldehyde can be given.

As the amine, an amine having 6 or more carbon atoms such as heptylamine, octylamine, nonylamine, laurylamine and 2-ethylhexylamine can be given.

As the electron-donor component (a), an alcohol as mentioned above is preferable. In particular, ethanol, propanol, butanol, isobutanol, hexanol, 2-ethylhexanol, decanol or the like are preferable.

The composition ratio of magnesium and the electron-donor component (a) in the resulting solid adduct or the magnesium compound in the liquid state differs depending on the type of the compound used, and hence, cannot be determined unconditionally. However, per mole of magnesium in the magnesium compound, the electron-donor component (a) is used preferably in an amount of 2 moles or more, more preferably 2.3 moles or more, further preferably 2.7 moles or more and 5 moles or less.

As particularly preferable examples of the electron-donor which is used in the solid titanium catalyst component (I) used in the invention according to need, an aromatic carboxylic acid ester and/or a compound having two or more ether bonds through a plurality of carbon atoms (hereinbelow referred to as the "electron-donor component (b)") can be given.

As the electron-donor component (b), a known aromatic carboxylic acid ester or a polyether compound which has preferably been used in a catalyst for olefin polymerization, e.g. a compound disclosed in JP-A-05-170843 or JP-A-2001-354714, can be used without restrictions.

As specific examples of the aromatic carboxylic acid ester, in addition to an aromatic carboxylic acid monoester such as benzoic acid ester and toluic acid ester, an aromatic polyvalent carboxylic acid ester such as phthalic acid ester can be given. Of these, an aromatic polyvalent carboxylic acid ester is preferable, with a phthalic acid ester being more preferable. As the phthalic acid ester, a phthalic alkyl ester such as ethyl phthalate, n-butyl phthalate, isobutyl phthalate, hexyl phthalate and heptyl phthalate are preferable, with diisobutyl phthalate being particularly preferable.

As the polyether compound, more specifically, a compound represented by the following formula (I) can be given.

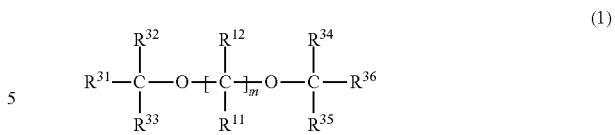

In the formula (1), m is an integer of $1 \leq m \leq 10$, more preferably, an integer of $3 \leq m \leq 10$, $R^{11}$ to $R^{36}$ are independently a hydrogen atom, or a substituent having at least one element selected from carbon, hydrogen, oxygen, fluorine, chlorine, bromine, iodine, nitrogen, sulfur, phosphor, boron and silicon.

When m is 2 or more, plural $R^{11}$s and $R^{12}$s may be the same or different. Arbitral $R^{11}$ to $R^{36}$, preferably $R^{11}$ and $R^{12}$, may be bonded with each other to form a ring other than a benzene ring.

Specific examples of the compound include mono-substituted dialkoxypropanes such as 2-isopropyl-1,3-dimethoxypropane, 2-s-butyl-1,3-dimethoxypropane, and 2-cumyl-1,3-dimethoxypropane; di-substituted dialkoxypropanes such as 2-isopropyl-2-isobutyl-1,3-dimethoxypropane, 2,2-dicyclohexyl-1,3-dimethoxypropane, 2-methyl-2-isopropyl-1,3-dimethoxypropane, 2-methyl-2-cyclohexyl-1,3-dimethoxypropane, 2-methyl-2-isobutyl-1,3-dimethoxypropane, 2,2-diisobutyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2,2-di-s-butyl-1,3-dimethoxypropane, 2,2-dineopentyl-1,3-dimethoxypropane, 2-isopropyl-2-isopentyl-1,3-dimethoxypropane, and 2-cyclohexyl-2-cyclohexylmethyl-1,3-dimethoxypropane; a dialkoxyalkane such as 2,3-dicyclohexyl-1,4-diethoxybutane, 2,3-dicyclohexyl-1,4-diethoxybutane, 2,3-diisopropyl-1,4-diethoxybutane, 2,4-diphenyl-1,5-dimethoxypentane, 2,5-diphenyl-1,5-dimethoxyhexane, 2,4-diisopropyl-1,5-dimethoxypentane, 2,4-diisobutyl-1,5-dimethoxypentane, and 2,4-diisoamyl-1,5-dimethoxypentane; and a trialkoxyalkane such as 2-methyl-2-methoxymethyl-1,3-dimethoxypropane, 2-cyclohexyl-2-ethoxymethyl-1,3-diethoxypropane and 2-cyclohexyl-2-methoxymethyl-1,3-dimethoxypropane.

Of these, 1,3-diether is preferable. In particular, 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane, and 2,2-bis(cyclohexylmethyl)-1,3-dimethoxypropane are preferable.

These compounds may be used singly or in combination of two or more.

In the solid titanium catalyst component (I), it is desired that the halogen/titanium ratio (atomic ratio) (i.e. the number of moles of a halogen atom/the number of moles of a titanium atom) be 2 to 100, preferably 4 to 90. As for the electron-donor component (a) or the electron-donor component (b), it is desired that the electron-donor component (a)/titanium atom (molar ratio) be 0 to 100, preferably 0 to 10, and that the electron-donor component (b)/titanium atom (molar ratio) be 0 to 100, preferably 0 to 10.

The magnesium/titanium ratio (atomic ratio) (i.e. the number of moles of a magnesium atom/the number of moles of a titanium atom) is 2 to 100, preferably 4 to 50.

As for more specific production conditions of the solid titanium catalyst component (I), the conditions stated in EP585869A1 (European Patent Application Publication No. 0585869), JP-A-H05-170843 or the like can be preferably used, except for the use of the electron donor component (b).

Next, an explanation will be made on the organic metal compound catalyst component (II) containing a metal element selected from the $1^{st}$ group, the $2^{nd}$ group and the $13^{th}$ group of the periodic table.

[Organic Metal Compound Catalyst Component (II)]

As the organic metal compound catalyst component (II), a compound comprising a metal belonging to the $13^{th}$ group, e.g. an organic aluminum compound, a complex alkyl compound of a metal belonging to the $1^{st}$ group and aluminum, an organic metal compound of a metal belonging to the $2^{nd}$ group or the like can be given. Of these, an organic aluminum compound is preferable.

As the organic metal compound catalyst component (II), specifically, the organic metal component catalyst component stated in known documents such as EP585869A1 mentioned above can be given as a preferable example.

As far as the object of the invention is not impaired, it can be used in combination with known electron donor components (c) in addition to the electron donor component (a) or the electron donor component (b).

As the electron donor component (c), an organic silicon compound can preferably be given. As the organic silicon compound, a compound represented by the following formula can be given.

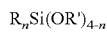

$R_nSi(OR')_{4-n}$ wherein R and R' are independently a hydrocarbon group and n is an integer of 0<n<4.

As specific examples of the organic silicon compound represented by the above formula, diisopropyldimethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, vinyltrimethoxysilane, vinyltriethoxysilane, t-butyltriethoxysilane, phenyltriethoxysilane, cyclohexyltrimethoxysilane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, dicyclopentylmethylmethoxysilane, dicyclopentylethylmethoxysilane, cyclopentyldimethylethoxysilane or the like can be given.

Of these, vinyltriethoxysilane, diphenyldimethoxysilane, dicyclohexyldimethoxysilane, cyclohexylmethyldimethoxysilane and dicyclopentyldimethoxysilane are preferable.

The silane compound represented by the following formula which is stated in WO2004/016662 is a preferable example of the organic silicon compound.

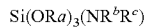

$Si(ORa)_3(NR^bR^c)$

In the formula, $R^a$ is a hydrocarbon group having 1 to 6 carbon atoms. As $R^a$, an unsaturated or saturated aliphatic hydrocarbon group having 1 to 6 carbon atoms or the like can be given. Particularly preferably, a hydrocarbon group having 2 to 6 carbon atoms can be given. Specific examples include a methyl group, an ethyl group, an n-propyl group, an iso-propyl group, an n-butyl group, an iso-butyl group, a sec-butyl group, an n-pentyl group, an iso-pentyl group, a cyclopentyl group, an n-hexyl group, a cyclopentyl group or the like. Of these, an ethyl group is particularly preferable.

$R^b$ is a hydrocarbon group having 1 to 12 carbon atoms or hydrogen. Examples of $R^b$ include an unsaturated or saturated aliphatic hydrocarbon group having 1 to 12 carbon atoms or hydrogen. Specific examples thereof include a hydrogen atom, a methyl group, an ethyl group, an n-propyl group, an iso-propyl group, an n-butyl group, an iso-butyl group, a sec-butyl group, an n-pentyl group, an iso-pentyl group, a cyclopentyl group, an n-hexyl group, a cyclohexyl group, an octyl group or the like. Of these, an ethyl group is particularly preferable.

$R^c$ is a hydrocarbon group having 1 to 12 carbon atoms. Examples of $R^c$ include an unsaturated or saturated aliphatic hydrocarbon group having 1 to 12 carbon atoms or hydrogen. Specific examples thereof include a methyl group, an ethyl group, an n-propyl group, an iso-propyl group, an n-butyl group, an iso-butyl group, a sec-butyl group, an n-pentyl group, an iso-pentyl group, a cyclopentyl group, an n-hexyl group, a cyclohexyl group, an octyl group or the like can be given. Of these, an ethyl group is particularly preferable.

Specific examples of the compound represented by the above formula include dimethylaminotriethoxysilane, diethylaminotriethoxysilane, diethylaminotrimethoxysilane, diethylaminotriethoxysilane, diethylaminotri-n-propoxysilane, di-n-propylaminotriethoxysilane, methyl-n-propylaminotriethoxysilane, t-butylaminotriethoxysilane, ethyl-n-propylaminotriethoxysilane, ethyl-iso-propylaminotriethoxysilane and methylethylaminotriethoxysilane.

As other examples of the organic silicon compound, compounds represented by the following formula can be given.

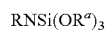

$RNSi(OR^a)_3$

In the formula, RN is a cyclic amino group. Examples of the cyclic amino group include a perhydroquinolino group, a perhydroisoquinolino group, a 1,2,3,4-tetrahydroquinolino group, a 1,2,3,4-tetrahydroisoquinolino group and an octamethyleneimino group Specific examples thereof include (perhydroquinolino)triethoxysilane, (perhydroisoquinolino)triethoxysilane, (1,2,3,4-tetrahydroquinolino)triethoxysilane, (1,2,3,4-tetrahydroisoquinolino)triethoxysilane, and octamethyleneiminotriethoxysilane These organic silicon compounds can be used in combination of two or more.

The propylene-ethylene block copolymer can be produced by a method in which propylene is polymerized in the presence of the above-mentioned catalyst for olefin polymerization, followed by copolymerization of propylene and ethylene, or propylene is polymerized in the presence of a preliminary polymerization catalyst obtained by preliminary polymerization, followed by copolymerization of propylene and ethylene or the like.

Preliminary polymerization is conducted by subjecting an olefin to polymerization in an amount of 0.1 to 1000 g, preferably 0.3 to 500 g, particularly preferably 1 to 200 g per gram of a catalyst for olefin polymerization.

In preliminary polymerization, a catalyst having a higher concentration than that of the catalyst in the system of polymerization can be used.

It is desired that the concentration of the solid titanium catalyst component (I) used in the preliminary polymerization be about 0.01 to 200 mmol, preferably about 0.01 to 50 mmol, particularly preferably 0.1 to 20 mmol relative to 1 l of a liquid medium, in terms of a titanium atom.

It suffices that the amount of the organic metal compound catalyst component (II) in the preliminary polymerization be an amount which enables a polymer normally in an amount of 0.1 to 1000 g, preferably 0.3 to 500 g, to be generated per gram of the solid titanium catalyst component (I). It is desired that the amount be normally about 0.1 to 300 moles, preferably about 0.5 to 100 moles, with 1 to 50 moles being particularly preferable per mole of a titanium atom in the solid titanium catalyst component (I).

In the preliminary polymerization, the electron donor component or the like can be used according to need. At this time, these components are used in an amount of normally 0.1 to 50 moles, preferably 0.5 to 30 moles, further preferably 1 to 10 moles, per mole of a titanium atom in the solid titanium catalyst component (I).

The preliminary polymerization can be conducted under moderate conditions by adding an olefin and the above-mentioned catalyst components to an inert hydrocarbon medium.

In this case, specific inert hydrocarbon mediums to be used include aliphatic hydrocarbons such as propane, butane, pentane, hexane, heptane, octane, decane, dodecane and kerosene; alicyclic hydrocarbons such as cyclopentane, methylcyclopentane, cyclohexane, cycloheptane, methylcycloheptane and cyclooctene; aromatic hydrocarbons such as benzene, toluene and xylene; halogenated hydrocarbon such as ethylene chloride and chlorobenzene; or a mixture thereof.

Of these inert hydrocarbon mediums, it is particularly preferable to use an aliphatic hydrocarbon. If an inert hydrocarbon medium is used as seen above, it is preferable to conduct preliminary polymerization by the batch method.

Further, preliminary polymerization can be conducted by using an olefin itself as a solvent. Preliminary polymerization can be conducted in the state which is substantially free of a solvent. In this case, it is preferable to conduct preliminary polymerization continuously.

An olefin used in the preliminary polymerization may be the same as or different from an olefin used in the polymerization mentioned later. However, propylene is preferable.

The temperature of the preliminary polymerization is normally −20 to +100° C., preferably −20 to +80° C., with 0 to +40° C. being further preferable.

Subsequently, an explanation is made on the polymerization which is conducted after the preliminary polymerization or without the preliminary polymerization.

The polymerization is divided into a step in which a propylene polymer component is produced and a step in which a propylene-ethylene copolymer rubber component is produced.

The preliminary polymerization and the polymerization can be conducted by any of the liquid phase polymerization method such as the bulk polymerization method, the solution polymerization method, and the suspension polymerization method and the gas phase polymerization method. As the step which is preferable for producing a propylene polymer component, a liquid phase polymerization method such as bulk polymerization or suspension polymerization or a gas phase polymerization can be given. As the step which is preferable for producing a propylene-ethylene copolymer rubber component, liquid phase polymerization such as bulk polymerization or suspension polymerization or gas phase polymerization can be given. Gas phase polymerization is more preferable.

If the polymerization is a slurry polymerization, as a reaction solvent, an inert hydrocarbon used in the above-mentioned preliminary polymerization can be used. An olefin which is a liquid at the reaction temperature or pressure can be used.

In the polymerization, the solid titanium catalyst component (I) is used normally in an amount of 0.0001 to 0.5 mmol, preferably about 0.005 to 0.1 mmol, per liter of polymerization volume, in terms of a titanium atom. The organic metal compound catalyst component (II) is used normally in an amount of about 1 to 2,000 moles, preferably about 5 to 500 moles, per mole of a titanium atom in the preliminary polymerization catalyst component in polymerization system.

The electron donor compound is used in an amount of 0.001 to 50 moles, preferably in an amount of 0.01 to 30 moles, particularly preferably 0.05 to 20 moles, per mole of the organic metal compound catalyst component (II), if it is used.

If the polymerization is conducted in the presence of hydrogen, it is possible to control (decrease) the molecular weight of the resulting polymer, whereby a polymer having a large melt flow rate can be obtained. The amount of hydrogen necessary to control the molecular weight differs according to the type of the production process used, the polymerization temperature and the pressure, and hence, may be adjusted appropriately.

In the process of producing propylene polymer components, the MFR can be controlled by adjusting the polymerization temperature and the amount of hydrogen. In the step of producing a propylene-ethylene copolymer rubber component, it is possible to adjust the limiting viscosity by controlling the polymerization temperature, the pressure and the amount of hydrogen.

In the polymerization, the polymerization temperature of an olefin is normally about 0 to 200° C., preferably about 30 to 100° C., more preferably 50 to 90° C. The pressure (gauge pressure) is normally set from normally pressure to 100 kgf/cm$^2$ (9.8 MPa), preferably, about 2 to 50 kgf/cm$^2$ (0.20 to 4.9 MPa).

In the method for producing a propylene-ethylene block copolymer, the polymerization can be conducted by any of the batch method, the semi-continuation method and the continuation method. Further, the shape of the reactor may be a tube or a chamber. The polymerization can be conducted by two or more stages by changing the reaction conditions. In this case, a tubular reactor and a chamber reactor may be used in combination.

In order to obtain a propylene-ethylene copolymer, the ethylene/(ethylene+propylene) gas ratio is controlled.

The ethylene/(ethylene+propylene) gas ratio is normally 5 to 80 mol %, preferably 10 to 70 mol %, more preferably 15 to 60 mol %.

A further detailed explanation will be made on the method for producing a propylene-ethylene block copolymer used in the invention.

Based on the finding of the inventors, a part which is insoluble in room temperature n-decane (Dinsol) constituting a propylene-ethylene block copolymer is mainly composed of a propylene polymer component.

On the other hand, a part which is soluble in room temperature n-decane (Dsol) is mainly composed of a propylene-ethylene copolymer rubber component.

Therefore, by continuously conducting the following two polymerization steps (polymerization step 1 and polymerization step 2), it is possible to obtain a propylene-ethylene block copolymer satisfying the above-mentioned requirements (hereinbelow, this method is referred to as the "direct polymerization method").

[Polymerization Step 1]

A step in which propylene is polymerized in the presence of a solid titanium catalyst component to produce a propylene polymer (propylene polymer production step)

[Polymerization Step 2]

A step in which propylene and ethylene are co-polymerized in the presence of a solid titanium catalyst component to produce a propylene-ethylene copolymer rubber component (rubber copolymer production step)

The propylene-ethylene block copolymer used in the invention is preferably produced by the above-mentioned production method. It is preferred that the polymerization step 1 be conducted in the first stage and the polymerization step 2 be conducted in the second stage. Further, each polymerization step (polymerization step 1 and polymerization step 2) may be conducted by means of two or more polymerization chambers. The content of the decane soluble part of the block copolymer may be adjusted by controlling the polymerization time (retention time) of the step 1 and the step 2.

(C) Ethylene-α-Olefin Copolymer

The ethylene-α-olefin copolymer used in the invention has an MFR (230° C. under the load of 2.16 kg) of 0.5 g/10 min or more and 20 g/10 min or less, preferably 0.5 g/10 min or more and 15 g/10 min or less. If the MFR is less than 0.5 g/10 min, the resin is not dispersed during melt kneading, and paint coat particles are generated on the surface of a molded product. As a result, sufficient impact strength cannot be obtained. On the other hand, if the MFR exceeds 20 g/10 min, sufficient impact strength cannot be obtained.

As the ethylene-α-olefin copolymer, a copolymer of ethylene and an α-olefin having 3 or more and 10 or less carbon atoms can be given. As the α-olefin, propylene, 1-butene, 1-hexene, 1-octene or the like are preferable. An α-olefin may be used singly or in combination of two or more.

The amount of an α-olefin in the ethylene-α-olefin copolymer is preferably 15 wt % or more and 65 wt % or less.

As the ethylene-α-olefin copolymer, an ethylene-octene copolymer and an ethylene-butene copolymer are preferable.

The amount of the ethylene-α-olefin copolymer is 6 parts by weight or more and 45 parts by weight or less relative to 100 parts by weight of the above-mentioned component (A). Preferably, the amount is 6 parts by weight or more and 40 parts by weight or less, with 6 parts by weight or more and 35 parts by weight or less being particularly preferable. If the amount is less than 6 parts by weight, an intended impact resistance cannot be obtained. On the other hand, if the amount exceeds 45 parts by weight, an intended tensile elasticity is not obtained, and gloss is increased. Further, scratch resistance is also lowered.

(D) Inorganic Filler Having an Average Diameter of 1 μm or More and 14 μm or Less No specific restrictions are imposed on the inorganic filler used in the invention, and a known inorganic filler can be used. For example, talc, mica, calcium carbonate, barium sulfate, glass fibers, gypsum, magnesium carbonate, magnesium oxide, titanium oxide or the like can be given. Of these, talc is particularly preferable.

The average particle diameter of the inorganic filler is 1 μm or more and 14 μm or less, preferably 3 μm or more and 7 μm or less. If the average particle diameter is less than 1 μm, the inorganic filler agglomerates, causing dispersion insufficiency. As a result, mechanical properties such as impact strength are deteriorated. On the other hand, if the average particle diameter is larger than 14 μm, mechanical properties such as impact strength and tensile elasticity are lowered.

The average particle diameter is a value measured by the laser diffraction method.

The amount of the inorganic filler is 25 parts by weight or more and 60 parts by weight or less relative to 100 parts by weight of the component (A). The amount is preferably 25 parts by weight or more and 50 parts by weight or less. If the amount is less than 25 parts by weight, tensile elasticity is lowered. On the other hand, if the amount exceeds 60 parts by weight, impact strength is lowered.

(E) Acid-Modified Polypropylene

In the propylene-based resin composition of the invention, 0.1 part by weight or more and 6.5 parts by weight or less, preferably 0.1 part by weight or more and 4.5 parts by weight or less, of acid-modified polypropylene is mixed relative to 100 parts by weight of the component (A). If the amount of the acid-modified polypropylene is less than 0.1 part by weight, effects of improving scratch resistance are not exhibited. On the other hand, if the amount of the acid-modified polypropylene exceeds 6.5 parts by weight, impact resistance is lowered.

Acid-modified propylene is obtained by subjecting polypropylene to acid modification. As the method for modifying polypropylene, graft modification or copolymerization can be given.

As the unsaturated carboxylic acid used in the modification, acrylic acid, methacrylic acid, maleic acid, nadic acid, fumaric acid, itaconic acid, crotonic acid, citraconic acid, sorbic acid, mesaconic acid, angelic acid, phthalic acid or the like can be given. As examples of the derivatives thereof, an acid anhydride, an ester, an amide, an imide, a metal salt or the like can be given. For example, maleic anhydride, itaconic anhydride, citraconic anhydride, nadic anhydride, phthalic anhydride, methyl acrylate, methyl methacrylate, ethyl acrylate, butyl acrylate, maleic acid monoethyl ester, acrylamide, maleic acid monoamide, maleimide, N-butyl maleimide, sodium acrylate and sodium methacrylate can be given. Of these, unsaturated dicarboxylic acid and its derivatives are preferable, with maleic anhydride or phthalic anhydride being particularly preferable.

If acid modification is conducted during melt kneading, by subjecting polypropylene and unsaturated carboxylic acid or its derivatives to melt kneading in an extruder using an organic peroxide, an unsaturated carboxylic acid or its derivative are graft copolymerized and modified.

As the organic peroxide, benzoyl peroxide, lauroyl peroxide, azobisisobutyronitrile, dicumylperoxide, t-butylhydroperoxide, α,α'-bis(t-butylperoxydiisopropyl)benzene, bis(t-butyldioxyisopropyl)benzene, 2,5-dimethyl-2,5-di(t-butylperoxy)hexane, 2,5-dimethyl-2,5-di(t-butylperoxy)hexine-3, di-t-butylperoxide and cumene hydroperoxide or the like can be given.

In the invention, as the acid-modified polypropylene, unsaturated dicarboxylic acid or acid-modified polypropylene modified by its derivatives is preferable, with maleic anhydride-modified polypropylene being preferable.

As the acid content in the acid-modified polypropylene, 0.5 wt % to 7.0 wt % is preferable, with 0.8 wt % to 5.0 wt % being further preferable.

The acid content can be measured by measuring the IR spectrum of acid-modified polypropylene, and by measuring the absorption peculiar to the acid used for modification. In the case of maleic anhydride, absorption appears at around $1780\ cm^{-1}$. In the case of a methacrylic ester, absorption appears at around $1730\ cm^{-1}$. The acid content can be measured from the peak area thereof.

As for the limiting viscosity of acid-modified polypropylene (135° C., in tetralin), one having about 0.1 to 3 dl/g can be used.

As examples of the acid-modified polypropylene, commercially-available products such as Admer manufactured by Mitsui Chemicals Inc., Youmex manufactured by Sanyo Chemical Industries, Inc., MZ series by Dupont Kabushiki Kaisha, Exxelor manufactured by Exxon Mobile Corporation and Polybond series by Toyokasei Co., Ltd. (each of them is maleic anhydride-modified polypropylene) can be given.

(F) Lubricant

As the lubricant, an aliphatic acid amide can be given. As examples of an aliphatic acid, a saturated or unsaturated aliphatic acid having about 15 to 30 carbon atoms can be given.

Specific examples of the aliphatic acid amide include oleic acid amide, stearic acid amide, erucamide, behenamide, palmitic acid amide, myristic acid amide, lauric acid amide, caprylic acid amide, caproic acid amide, n-oleyl palmitamide, n-oleyl erucamide, a dimer thereof or the like.

They are used singly or in combination.

The amount of the lubricant is 0.15 parts by weight or more and 5.0 parts by weight or less, preferably 0.2 parts by weight or more and 3.0 parts by weight or less relative to 100 parts by weight of the above-mentioned component (A). If the amount of the lubricant is less than 0.15 parts by weight, sufficient effects of improving scratch resistance cannot be exhibited. On the other hand, if the amount of the lubricant exceeds 5.0 parts by weight, the lubricant may breed out from the composition and adhere to a mold, leading to contamination of a mold.

In the polypropylene-based composition of the invention, according to need, an additive such as a thermal stabilizer, an antistatic agent, an anti-weather stabilizer, a light stabilizer, an antioxidant, an aliphatic acid metal salt, a dispersant, a colorant, a pigment or the like can be added as long as the object of the invention is not impaired. The composition of the invention may be composed of 90 wt % or more, 95 wt % or more, 98 wt % or more and 100 wt % of components (A) to (F), and the above-mentioned additive, according to need.

In the polypropylene-based composition of the invention, it is preferred that the MFR (230° C., under the load of 2.16 kg) be 10 g/10 min or more and 45 g/10 min or less, with 15 g/10 min or more and 30 g/10 min or less being particularly preferable.

The polypropylene-based composition of the invention can be produced by mixing the above-mentioned components (A) to (F) and other additives, according to need, by a known method. For example, the components may be mixed by means of various mixers, tumblers or the like. Further, a mixture obtained by this mixing may be subjected to melt kneading by means of an extruder or the like. Further, in order to allow molding to be conducted easily, the composition of the invention may be processed into pellets or the like.

The composition of the invention may be processed into various molded products by a known processing method, e.g. injection molding, extrusion molding or the like. The molded product of the invention is almost free from flow marks or the like and has excellent low gloss property and scratch resistance. Therefore, it can be used as a product without providing a post treatment such as coating or lamination of outer layers. Therefore, it can be used preferably as an interior material (instrument panel, pillar, door trim, or the like) of an automobile.

EXAMPLES

The invention will be described in more detail with reference to the following Examples.

Methods for measuring the properties of each component and the polypropylene-based resin composition of the invention as well as the method for evaluating the polypropylene-based resin composition and the molded product will be explained below.

(1) Room Temperature Decane-Soluble Part

The amount of a decane-soluble part at room temperature (25° C.) of the propylene-ethylene block copolymer was obtained as follows. First, a sample was precisely weighed in an amount of 5 g, and placed in a 1,000 ml-egg-plant-shaped flask. Further, 1 g of BHT (dibutylhydroxytoluene, a phenol-based antioxidant) was added, followed by incorporation of a rotor and 700 ml of n-decane.

Subsequently, a cooler was attached to the egg-plant-shaped flask. While actuating the rotor, the flask was heated for 120 minutes in an oil bath of 135° C., whereby the sample was dissolved in n-decane.

Subsequently, after pouring the content of the flask to a 1,000 ml-beaker, the solution in the beaker was stirred by means of a stirrer, and was allowed to cool (8 hours or longer) to room temperature (25° C.). Then, the precipitates were filtered out by means of a wire gauge. The filtrate was further filtered by means of a filter paper, and poured to 2,000 ml of methanol placed in a 3,000 ml-beaker. This liquid was stirred by means of a stirrer at room temperature (25° C.), and allowed to stand for 2 hours or longer.

Then, the precipitates obtained were filtered out by means of a wire gauge, and dried in the air for 5 hours or longer. Thereafter, the precipitates were dried at 100° C. for 240 to 270 minutes in a vacuum drier to collect an n-decane soluble part at 25° C.

The content (x) of the n-decane soluble part at 25° C. is expressed by x (mass %)=100×C/A, assuming that the weight of the sample is Ag and the weight of the collected n-decane soluble part is Cg.

(2) The Amount of Ethylene in the Room Temperature n-Decane Soluble Part

Measured by the Fourier Transform Infrared Spectroscopy (FT-IR).

(3) The Limiting Viscosity [η] of the Room Temperature n-Decane Soluble Part

Measured in decaline at 135° C.

(4) Measurement of Melt Flow Rate

Measured according to ISO1133 under the load of 2.16 kg at a test temperature of 230° C.

(5) Average Particle Diameter of Inorganic Filler

Measured by the laser diffraction method.

(6) Content of Acid-Modified Group 2 g of acid-modified polypropylene was collected and completely dissolved by heating in 500 ml of boiling p-xylene. After cooling, the resulting solution was incorporated in 1200 ml of acetone, and precipitates were filtered out and dried, whereby a purified polymer product was obtained. A 20 μm-thick film was prepared by thermal press. The infrared absorption spectrum of the thus prepared film was measured and the content of the acid-modified group was measured from the peak area at 1780 cm$^{-1}$.

(7) Charpy Impact Strength at Room Temperature (kJ/m$^2$)

Measured according to ISO 179, notched, hammer capacity 4 J and at a temperature of 23° C.

(8) Tensile Elasticity

According to ISO 527, measured at a tensile speed of 1 mm/min and at a temperature of 23° C.

(9) Method for Measuring Flow Marks

A molded product of 350 mm×100 mm×2 mm (thickness) was prepared at a molding temperature of 210° C., a mold temperature of 40° C., an injection speed of 25 mm/s, a pressure dwell of 30 MPa and a pressure dwell time of 10 sec. A distance from a gate to a point at which the flow marks can be visually observed was measured.

(10) Mirror Gloss

By means of a gloss meter (NDH-300, manufactured by Nippon Denshoku Co., Ltd.), the mirror gloss of the surface of a molded product (length: 130 mm, width: 120 mm and thickness: 3 mm) obtained by molding at a molding temperature of 210° C. and a mold temperature of 40° C. was measured at a light field angle of 60°.

(11) Scratch Resistance

The surface of a molded product obtained by molding at a temperature of 210° C. and a mold temperature of 40° C. (a rectangular plate having a length of 130 mm, a width of 120 mm and a thickness of 2 mm) was subjected to surface texturing of Grain C. By using this molded product, the maximum load (N) was evaluated by a Ford 5-Finger Test at which no whitening was observed with naked eyes.

The methods for producing the components (A) and (B) used in Examples and Comparative Examples are explained below.

Production Example 1

Component (A-1)

(1) Preparation of a Solid Titanium Catalyst Component 952 g of magnesium chloride anhydride, 4420 ml of decane and 3906 g of 2-ethyhexyl alcohol were heated at 130° C. for 2 hours to obtain a homogenous solution. To this solution, 213 g of phthtalic anhydride was added, followed by mixing by stirring at 130° C. for further one hour to dissolve the phthalic anhydride.

The thus obtained homogenous solution was cooled to 23° C. Thereafter, 750 ml of this homogenous solution was added dropwise for 1 hour to 2000 ml of titanium tetrachloride kept at −20° C. After the dropwise addition, the temperature of the resulting mixture was elevated to 110° C. for 4 hours. After it reached 110° C., 52.2 g of diisobutyl phthalate (DIBP) was added. While stirring for 2 hours, the resultant was kept at 110° C. Subsequently, a solid part was collected by hot filtration, and this solid part was re-suspended in 2750 ml of titanium tetrachloride. Then, the suspension was heated at 110° C. over 2 hours.

After heating, the solid part was collected again by hot filtration. By using decane and hexane of 110° C., the solid part was washed until no titanium compound was detected in a washing liquid.

The solid titanium catalyst component prepared as above was kept as a hexane slurry. Part of this was dried to examine the composition of the catalyst. The solid titanium catalyst component contained 2 wt % of titanium, 57 wt % of chlorine, 21 wt % of magnesium and 20 wt % of DIBP.

(2) Production of Pre-Polymerization Catalyst 87.5 g of a solid catalyst component, 99.8 mL of triethylaluminum, 28.4 ml of diethylaminotriethoxysilane and 12.5 L of heptane were placed in an autoclave having an internal volume of 20 L provided with a stirrer. The internal temperature was kept at 15 to 20° C., and 875 g of propylene was inserted. A reaction was conducted with stirring for 100 minutes. After completion of the polymerization, the solid components were allowed to precipitate, and a supernatant was removed and washed with heptane twice. The resulting preliminary polymerization catalyst was re-suspended in purified heptane, and adjusted by heptane such that the concentration of the solid catalyst component became 0.7 g/L.

(3) Polymerization

To a circulation tubular polymerization apparatus provided with a jacket having an internal volume of 58 L, propylene, hydrogen, the catalyst slurry prepared in (2) as a solid catalyst component, triethylaluminum and diethylaminotriethoxysilane were continuously supplied at a rate of 40 kg/hr, 123 NL/h, 0.30 g/hr, 2.1 ml/hr, and 0.88 ml/hr, respectively, and polymerization was conducted in the flooded state with no vapor phase. The temperature of the tubular polymerization apparatus was 70° C. and the pressure was 3.3 MPa/G.

The resulting slurry was supplied to a vessel polymerization apparatus provided with a stirrer having an internal volume of 100 L, and polymerization was further conducted. To the polymerization apparatus, propylene was supplied at a flow rate of 15 kg/hour and hydrogen was supplied such that the hydrogen concentration of the vapor phase part became 3.3 mol %. The polymerization was conducted at a polymerization temperature of 70° C. and a pressure of 3.1 MPa/G.

The resulting slurry was transferred to a pipette having an internal volume of 2.4 L, where the slurry was gasified to conduct solid-gas separation. Thereafter, polypropylene homopolymer powder was supplied to a vapor phase polymerization apparatus having an internal volume of 480 L, where ethylene/propylene block copolymerization was conducted. Propylene, ethylene and hydrogen were continuously supplied such that the ethylene/(ethylene+propylene) became 0.24 (molar ratio) and the hydrogen/ethylene became 0.10 (molar ratio). Polymerization was conducted at a polymerization temperature of 70° C. and at a pressure of 1.2 MPa/G. The resulting propylene-based block copolymer was dried in vacuum at 80° C. The composition and properties of the resulting propylene-based block copolymer (A-1) are shown in Table 1.

Production Example 2

Component (A-2)

Polymerization was conducted in the same manner as in Production Example 1 (3) polymerization, except that the polymerization (3) was changed as follows.

(3) Polymerization

To a circulation tubular polymerization apparatus provided with a jacket having an inner volume of 58 L, propylene, hydrogen, the catalyst slurry prepared in (2) as a solid catalyst component, triethylaluminum and diethylaminotriethoxysilane were continuously supplied at a flow rate of 45 kg/hr, 189 NL/hr, 0.41 g/hr, 2.7 ml/hr and 1.1 ml/hr, respectively. Polymerization was conducted in the flooded state with no vapor phase. The temperature of the tubular polymerization apparatus was 70° C., and the pressure was 3.4 MPa/G.

The resulting slurry was a vessel polymerization apparatus provided with a stirrer having an internal volume of 100 L, and polymerization was further conducted. To the polymerization apparatus, propylene was supplied at a flow rate of 15 kg/hr and hydrogen was supplied such that the hydrogen concentration of the vapor phase part became 6.0 mol %. Polymerization was conducted at a polymerization temperature of 70° C. and a pressure of 3.3 MPa/G.

The resulting slurry was transferred to a pipette having an internal volume of 2.4 L, where the slurry was gasified to conduct gas-solid separation. To a gas phase polymerization apparatus having an internal volume of 480 L, polypropylene homopolymer powder was sent, where ethylene/propylene block copolymerization was conducted. Propylene, ethylene and hydrogen were continuously supplied to the vapor phase polymerization apparatus such that the gas composition in the polymerization apparatus became ethylene/(ethylene+propylene)=0.21 (molar ratio) and hydrogen/ethylene=0.13 (molar ratio). Polymerization was conducted at a polymerization temperature of 70° C. and a pressure of 1.2 MPa/G. The resulting propylene-based block copolymer was dried in vacuum at 80° C. The composition and the properties of the resulting propylene-based block copolymer (A-2) are shown in Table 1.

Production Example 3

Component (A-3)

(1) Preparation of a Solid Titanium Catalyst Component (i) Preparation of a Solid Component A high-speed stirring machine having an internal volume of 2 l (manufactured by Tokushukika Co., Ltd.) was fully replaced by nitrogen. Subsequently, 700 ml of purified kerosene, 10 g of commercially available magnesium chloride, 24.2 g of ethanol and 3 g of EMASOL 320 (sorbitan distearate manufactured by Kao Corporation) were put in the machine. The system was heated while stirring, and stirring was conducted at 120° C. for 30 minutes at a rate of 800 rpm. Under high-speed stirring, by using a Teflon (registered trademark)-made tube having an internal diameter of 5 mm, the liquid was transferred to a 2 l-glass flask (provided with a stirrer) in which 1 l of purified kerosene was placed, which had been cooled in advance at −10° C. The purified solids were fully washed with purified n-hexane by filtration, whereby a solid-like adduct in which ethanol is coordinated to magnesium chloride was obtained.

75 mmol (in terms of a magnesium atom) of the solid-like adduct which was suspended in 50 ml of decane was incorporated with stirring into 200 ml of titanium tetrachloride kept at −20° C. This mixture was heated to 110° C. over 5.5 hours. When the temperature of the mixture reached 110° C., 3.0 ml (11.25 mmol) of diisobutyl phthalate and 0.026 ml (0.11 mmol) of 2-isobutyl-2-isopropyl-1,3-dimethoxypropane were added. Subsequently, the resultant was stirred at 110° C. for 1.5 hours.

After the completion of the reaction for 1.5 hours, the solid part was collected by hot filtration, and the solid part was washed with decane of 100° C. and hexane of room temperature until no titanium was detected in the filtrate.

(ii) Preparation of Solid Titanium Catalyst Component

In a 200 ml-glass reactor which had been fully replaced by nitrogen, 150 ml of 2,4-dichlorotoluene, 4.5 ml (40.9 mmol) of titanium tetrachloride and 0.55 ml (2.06 mmol) of diisobutyl phthalate were placed. Subsequently, 4.56 g of the solid component obtained above was incorporated. Thereafter, the temperature in the reactor was elevated to 130° C., and stirring was conducted at the temperature for 1 hour. After a one-hour contact treatment, the solid part was collected by hot filtration, the solid part was re-suspended in 150 ml of 2,4-dichlorotoluene. Further, 4.5 ml (40.9 mmol) of titanium tetrachloride and 0.55 ml of diisobutyl phthalate were added. Thereafter, the temperature was elevated. When the temperature reached 130° C., the resultant was retained at this temperature with stirring for 1 hour.

After completion of the reaction, the solid-liquid separation was conducted again by hot filtration. The resulting solid part was washed with decane of 100° C. and hexane of room temperature until the amount of 2,4-dichlorotoluene became 1 wt % or less in the catalyst. As a result, a solid-like titanium catalyst component containing 1.3 wt % of titanium, 21 wt % of magnesium and 14.4 wt % of diisobutyl phthalate was obtained.

(2) Production of a Preliminary Polymerization Catalyst 56 g of the solid catalyst component, 6.2 mL of triethylaluminum and 80 L of heptane were placed in an autoclave with a stirrer having an internal volume of 200 L. The internal temperature was kept at 5 to 15° C., and 560 g of propylene was inserted, and a reaction was conducted with stirring for 70 minutes. After completion of polymerization, removal of a supernatant and washing with heptane were not conducted.

(3) Polymerization

In a circulation-type tubular polymerization apparatus provided with an internal volume of 58 L, propylene, hydrogen, the catalyst slurry prepared in (2) as the solid catalyst component, triethyl aluminum and cyclohexylmethyldimethoxysilane were continuously supplied at flow rates of 30 kg/hr, 107 NL/hr, 0.22 g/hr, 3.4 ml/hr and 1.0 ml/hr, respectively. Polymerization was conducted in the flooded state with no vapor phase. The temperature of the tubular polymerization apparatus was 70° C., and the pressure was 3.5 MPa/G.

The resulting slurry was supplied to a vessel polymerization apparatus provided with a stirrer having an internal volume of 100 L, and further polymerization was conducted. To the polymerization apparatus, propylene was supplied at a flow rate of 15 kg/hr, and hydrogen was supplied such that the hydrogen concentration of the vapor phase became 3.5 mol %. Polymerization was conducted at a temperature of 70° C. and a pressure of 3.3 MPa/G.

The resulting slurry was transferred to a pipette having an internal volume of 2.4 L, and the slurry was gasified to conduct gas-solid separation. Polypropylene homopolymer powder was sent to a vapor phase polymerization apparatus having an internal volume of 480 L, where ethylene/propylene block copolymerization was conducted. Propylene, ethylene and hydrogen were continuously supplied such that the gas composition in the vapor phase polymerization apparatus became ethylene/(ethylene+propylene)=0.28 (molar ratio) and hydrogen/ethylene=0.18 (molar ratio). Polymerization was conducted at a polymerization temperature of 70° C. and under a pressure of 1.2 MPa/G. The resulting propylene-based block copolymer was dried in a vacuum at 80° C. The composition and the properties of the resulting propylene-based block copolymer (A-3) are shown in Table 1.

Production Example 4

Component (A-4)

(1) Preparation of a Solid-Like Titanium Catalyst Component

A vibration mill provided with four pulverization pots each having an internal volume of 4 L and containing a 9-kg weight steel ball having a diameter of 12 mm was prepared. In each pot, 300 g of magnesium chloride, 115 mL of diisobutyl phthalate and 60 mL of titanium tetrachloride were added in the atmosphere of nitrogen, followed by pulverization of 40 hours.

75 g of the above-mentioned co-ground product was put in a 5 L-flask. 1.5 L of toluene was added, and the resultant was stirred at 114° C. for 30 minutes. Subsequently, the flask was allowed to stand to remove the supernatant. The solid matters were washed with 1.5 L of n-heptane at 20° C. three times. Further, the solid matters were dispersed in 1.5 L of n-heptane to obtain a transitional metal catalyst component slurry. The resulting transitional metal catalyst component contained 2 wt % of titanium and 18 wt % of diisobutyl phthalate.

(2) Production of Preliminary Polymerization Catalyst 115 g of a transitional metal catalyst component, 65.6 mL of triethyl aluminum, 22.1 mL of 2-isobutyl-2-isopropyl-1,3- dimethoxypropane and 115 L of heptane were placed in a 200 L-autoclave provided with a stirrer. The internal temperature was kept at 5° C., and 1150 g of propylene was incorporated. A reaction was conducted while stirring for 60 minutes. After completion of the polymerization, 15.8 mL of titanium tetrachloride was incorporated to obtain a preliminary polymerization catalyst.

(3) Polymerization

In a vessel polymerization apparatus having an internal volume of 1,000 L provided with a stirrer, propylene, catalyst slurry as the transitional metal catalyst component, triethylaluminum and dicyclopentyldimethoxysilane were continuously supplied at flow rates of 159 kg/hr, 1.4 g/hr, 21.9 ml/hr and 2.8 mL/hr, respectively. Hydrogen was supplied such that the hydrogen concentration of the vapor part became 13.4 mol %. Polymerization was conducted at a polymerization temperature of 68° C. and a pressure of 3.6 MPa/G.

The resulting slurry was sent to the vessel polymerization apparatus having an internal volume of 500 L provided with a stirrer. To the polymerization apparatus, propylene was supplied at a flow rate of 37 kg/hr and hydrogen was supplied such that the hydrogen concentration of the vapor part became 11.5 mol %. Polymerization was conducted at a polymerization temperature of 68° C. and a pressure of 3.4 MPa/G.

The resulting slurry was sent to a vessel polymerization apparatus having an internal volume of 500 L provided with a stirrer, and polymerization was further conducted. To the polymerization apparatus, propylene was supplied at a flow rate of 19 kg/hr and hydrogen was supplied such that the hydrogen concentration of the vapor phase became 8.0 mol %. Polymerization was conducted at a polymerization temperature of 68° C. and a pressure of 3.4 MPa/G.

The resulting slurry was sent to a vessel polymerization apparatus having an internal volume of 500 L provided with a stirrer, and polymerization was further conducted. To the polymerization apparatus, propylene was supplied at a flow rate of 15 kg/hr and hydrogen was supplied such that the hydrogen concentration in the vapor phase became 0.27 mol %, polymerization temperature was 65° C. and ethylene was incorporated such that the pressure became 3.2 MPa/G. Diethylene glycol ethyl acetate was added in an amount of 26 mole times per Ti component of the transitional metal catalyst components.

The resulting slurry was subjected to solid-vapor separation after deactivation and gasification. The resulting propylene-based block copolymer was dried in a vacuum at 80° C. The composition and properties of the thus obtained propylene-based block copolymer (A-4) are shown in Table 1.

Production Example 5

Component (A-5)

Component (A-5) was produced in the same manner as in Production Example 1, except that the polymerization (3) was conducted as follows.
(3) Polymerization In a vessel polymerization apparatus having an internal volume of 1,000 L provided with a stirrer, propylene, catalyst slurry as the transitional metal catalyst component, triethylaluminum and diethylaminotriethoxysilane were continuously supplied at flow rates of 131 kg/hr, 0.67 g/hr, 19.7 ml/hr and 4.4 mL/hr, respectively. Hydrogen was supplied such that the hydrogen concentration of the vapor part became 5.9 mol %. Polymerization was conducted at a polymerization temperature of 75° C. and a pressure of 3.5 MPa/G.

The resulting slurry was sent to a vessel polymerization apparatus having an internal volume of 500 L provided with a stirrer and polymerization was further conducted. To the polymerization apparatus, propylene was supplied at a flow rate of 30 kg/hr and hydrogen was supplied such that the hydrogen concentration of the vapor phase became 4.6 mol %. Polymerization was conducted at a temperature of 74.5° C. and a pressure of 3.5 MPa/G.

The resulting slurry was sent to a vessel polymerization apparatus having an internal volume of 500 L provided with a stirrer and polymerization was further conducted. To the polymerization apparatus, propylene was supplied at a flow rate of 20 kg/hr and hydrogen was supplied such that the hydrogen concentration of the vapor part became 4.0 mol %. Polymerization was conducted at a polymerization temperature of 73° C. and a pressure of 3.4 MPa/G.

The resulting slurry was sent to a vessel polymerization apparatus having an internal volume of 500 L provided with a stirrer and polymerization was further conducted. To the polymerization apparatus, propylene was supplied at a flow rate of 15 kg/hr and hydrogen was supplied such that the hydrogen concentration of the vapor phase became 0.17 mol %. Polymerization was conducted at a temperature of 67° C. and a pressure of 3.3 MPa/G. Diethylene glycol ethyl acetate was added in an amount of 46 mole times per Ti component of the transition metal catalyst components.

The resulting slurry was subjected to solid-vapor separation after deactivation and gasification. The resulting propylene-based block copolymer was dried in vacuum at 80° C. The composition and properties of the thus obtained propylene-based block copolymer (A-5) are shown in Table 1.

Production Example 6

Component (B)

Component (B) was produced in the same manner as in Production Example 1, except that the polymerization (3) was conducted as follows.
(3) Polymerization In a circulation tubular polymerization apparatus having an internal volume of 58 L provided with a jacket, propylene, hydrogen, catalyst slurry prepared in (2) as the solid catalyst component, triethylaluminum and diethylaminotriethoxysilane were continuously supplied at flow rates of 40 kg/hr, 156 NL/hr, 0.33 g/hr, 2.2 ml/hr and 0.9 ml/hr, respectively. Polymerization was conducted in the flooded state with no vapor phase. The temperature of the tubular polymerization apparatus was 70° C. and the pressure was 3.5 MPa/G.

The resulting slurry was sent to a vessel polymerization apparatus having an internal volume of 100 L provided with a stirrer and polymerization was further conducted. To the polymerization apparatus, propylene was supplied at a flow rate of 15 kg/hr and hydrogen was supplied such that the hydrogen concentration of the vapor phase became 4.3 mol %. Polymerization was conducted at a temperature of 69° C. and a pressure of 3.3 MPa/G.

The resulting slurry was transferred to a pipette having an internal volume of 2.4 L, where the slurry was gasified to conduct gas-solid separation. To a gas phase polymerization apparatus having an internal volume of 480 L, polypropylene homopolymer powder was sent, where ethylene/propylene block copolymerization was conducted. Propylene, ethylene and hydrogen were continuously supplied to the vapor phase polymerization apparatus such that the gas composition in the polymerization apparatus became ethylene/(ethylene+propylene)=0.21 (molar ratio) and hydrogen/ethylene=0.0063 (molar ratio). Polymerization was conducted at a polymerization temperature of 70° C. and a pressure of 1.5 MPa/G.

The resulting propylene-based block copolymer was dried in vacuum at 80° C. The composition and the properties of the resulting propylene-based block copolymer (B) are shown in Table 1.

TABLE 1

| Copolymer | Room temperature decane soluble part (wt %) | Room temperature decane soluble part Amount of ethylene (mol %) | Room temperature decane soluble part Limiting viscosity η(dl/g) | MFR (g/10 min) |
|---|---|---|---|---|
| A-1 | 24 | 40 | 2.5 | 30 |
| A-2 | 24 | 40 | 2.5 | 50 |
| A-3 | 18.5 | 40 | 2.2 | 30 |
| A-4 | 12 | 38 | 6.0 | 55 |
| A-5 | 11 | 40 | 7.5 | 80 |
| B | 23 | 41 | 7.2 | 13 |

Examples 1 to 13 and Comparative Examples 1 to 8

As shown in Tables 2 and 3, each component was mixed and subjected to dry blending by a tumbler. The resulting mixture was kneaded by a twin screw extruder (Product Name, TEX: produced by the Japan Steel Works, Ltd.) to produce polypropylene-based resin composition pellets. The kneading conditions were a kneading temperature of 180° C., a screw rotation speed of 1,100 rpm and a discharge amount of 100 kg/h.

The resulting pellets were processed by molding into samples for the above-mentioned evaluation by injection molding. The results are shown in Tables 2 and 3.

TABLE 2

| | Mixture (parts by weight) | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 |
|---|---|---|---|---|---|---|---|---|---|---|---|---|---|---|
| Component (A) | A-1 | 100 | 100 | 63 | 17 | 100 | 63 | 100 | | | | | | |
| | A-2 | | | 37 | 83 | | 37 | | | | | 100 | | |
| | A-3 | | | | | | | | 100 | 100 | 100 | | | |
| | A-4 | | | | | | | | | | | | 100 | |
| | A-5 | | | | | | | | | | | | | 100 |
| Component (B) | | 25 | 25 | 25 | 56 | 25 | 25 | 25 | 25 | 26 | 29 | 21 | 30 | 45 |
| Component (C) | C-1 | | | | | | | 8 | | | | | | |
| | C-2 | | | | 10 | | | | | | | 8 | | |
| | C-3 | 8 | 8 | 8 | | 8 | | | 8 | 14 | 23 | | | |
| | C-4 | | | | | | 8 | | | | | | | |
| | C-5 | | | | | | | | | | | | 30 | |
| | C-6 | | | | | | | | | | | | | 35 |
| Component (D) | Talc 1 | 33 | 33 | 33 | 42 | 33 | 33 | 33 | 33 | 35 | 39 | 33 | 41 | 46 |
| Component (E) | E-1 | 0.5 | 0.2 | 0.2 | 0.2 | | 0.2 | 0.2 | 0.2 | 0.2 | 0.2 | 0.5 | 0.2 | 0.2 |
| | E-2 | | | | | 0.5 | | | | | | | | |
| Component (F) | Erucamide | 0.5 | 0.5 | 0.5 | 0.6 | 0.5 | 0.5 | 0.5 | 0.5 | 0.5 | 0.6 | 0.5 | 0.5 | 0.5 |
| MFR of composition | g/10 min | 19 | 22 | 24 | 23 | 20 | 25 | 25 | 20 | 18 | 16 | 41 | 16 | 14 |
| Charpy impact strength | KJ/m²(23° C.) | 13.7 | 16.2 | 13.4 | 13.6 | 13.2 | 14.7 | 16.2 | 12.7 | 15.4 | 18.1 | 10.3 | 33.9 | 22.1 |
| Modulus elasticity | MPa | 2041 | 2032 | 2064 | 2072 | 2035 | 2073 | 2082 | 2131 | 2013 | 1892 | 2062 | 2025 | 1962 |
| Flow marks | mm | 127 | 130 | 134 | 178 | 129 | 136 | 134 | 132 | 128 | 122 | 145 | 182 | 214 |
| Gloss (Mirror) | % | 28 | 28 | 26 | 29 | 28 | 28 | 31 | 29 | 30 | 33 | 33 | 27 | 17 |
| Scratch resistance | N (load at which whitening starts) | 13N | 11N | 11N | 11N | 13N | 11N | 11N | 11N | 11N | 11N | 13N | 13N | 13N |

TABLE 3

| | Mixture (part by weight) | Com. Ex. 1 | Com. Ex. 2 | Com. Ex. 3 | Com. Ex. 4 | Com. Ex. 5 | Com. Ex. 6 | Com. Ex. 7 | Com. Ex. 8 |
|---|---|---|---|---|---|---|---|---|---|
| Component (A) | A-1 | 68 | 92 | 27 | 83 | 63 | 63 | 63 | 63 |
| | A-2 | 32 | 8 | 73 | 17 | 37 | 37 | 37 | 37 |
| | A-3 | | | | | | | | |
| Component (B) | | 24 | 15 | 34 | 23 | 25 | 25 | 25 | 25 |

TABLE 3-continued

| Mixture (part by weight) | | Com. Ex. 1 | Com. Ex. 2 | Com. Ex. 3 | Com. Ex. 4 | Com. Ex. 5 | Com. Ex. 6 | Com. Ex. 7 | Com. Ex. 8 |
|---|---|---|---|---|---|---|---|---|---|
| Component (C) | C-1 | | | | | | | | |
| | C-2 | 5 | 8 | 48 | 8 | 8 | | | |
| | C-3 | | | | | | 8 | 8 | 8 |
| | C-4 | | | | | | | | |
| Component (D) | Talc 1 | 32 | 31 | 45 | 21 | | 33 | 33 | 33 |
| | Talc 2 | | | | | 33 | | | |
| Component (E) | E-1 | 0.5 | 0.5 | 0.7 | 0.45 | 0.5 | 0.08 | 7.8 | 0.5 |
| | E-2 | | | | | | | | |
| Component (F) | Erucamide | 0.5 | 0.5 | 0.7 | 0.45 | 0.5 | 0.5 | 0.5 | 0.13 |
| MFR of composition | g/10 min | 23 | 24 | 16 | 25 | 24 | 25 | 19 | 26 |
| Charpy impact strength | KJ/m$^2$(23° C.) | 8.8 | 14.3 | 37.6 | 17.9 | 9.6 | 14.2 | 9.4 | 13.9 |
| Tensile | MPa | 2138 | 2048 | 1615 | 1634 | 1913 | 2064 | 1982 | 2053 |
| Flow marks | mm | 130 | 118 | 124 | 146 | 136 | 138 | 122 | 142 |
| Gloss (mirror) | % | 32 | 37 | 51 | 34 | 30 | 27 | 26 | 28 |
| Scratch resistance | N (load at which whitening starts) | 13N | 13N | 10N | 15N | 13N | 8N | 13N | 7N |

Component (A): Propylene-Ethylene Block Copolymer A
(A-1) Manufactured by Prime Polymer Co., Ltd. Product Name: PrimePolypro
(A-2) Manufactured by Prime Polymer Co., Ltd. Product Name: PrimePolypro
(A-3) CCC CHEMICAL COMMERCE CO., LTD Product Name: TPP
(A-4) Manufactured by Prime Polymer Co., Ltd. Product Name: PrimePolypro
(A-5) Manufactured by Prime Polymer Co., Ltd. Product Name; PrimePolypro
Component (B): Propylene-Ethylene Block Copolymer B Manufactured by Prime Polymer Co., Ltd. Product Name: PrimePolypro
Component (C): Ethylene-α-Olefin Block Copolymer
(C-1) Ethylene-octene random copolymer (Product Name: EG8100, manufactured by Dow Chemical Company) MFR=2.0 g/10 min, the amount of α-olefin (butene): 37.4 wt %
(C-2) Ethylene-octene random copolymer (Product Name: EG8200, manufactured by Dow Chemical Company) MFR=9 g/10 min, the amount of α-olefin (octene): 37.4 wt %
(C-3) Ethylene-butene random copolymer (Product Name: A0550S, manufactured by Mitsui Chemicals, Inc.) MFR=1.8 g/10 min, the amount of α-olefin (octene): 29.1 wt %
(C-4) Ethylene-butene random copolymer (Product Name: A4050S, manufactured by Mitsui Chemicals, Inc.) MFR=8 g/10 min, the amount of α-olefin (butene): 29.1 wt %
(C-5) Ethylene-butene random copolymer (Product Name: A1050S)
MFR=2.4 g/10 min, the amount of α-olefin (butene): 29.1 wt %
(C-6) Ethylene-butene random copolymer (Product Name: A0250S, manufactured by Mitsui Chemicals, Inc.) MFR=1.0 g/10 min, the amount of α-olefin (butene): 29.1 wt %
Component (D): Inorganic Filler
Talc 1 (Product Name: JM209 manufactured by Asada Milling Co., Ltd. Average Particle Size (laser diffraction: 5 μm)
Talc 2 (Product Name: UG Agent manufactured by Nippon Talc Co., Ltd, Average Particle Size (laser diffraction: 15 μm)
Component (E): Acid-Modified Polypropylene
(E-1) Maleic anhydride-modified polypropylene (Adomer QX-100, manufactured by Mitsui Chemicals, Inc.
[η]=0.43 dl/g (135° C., measured in Tetralin), the amount of a maleic acid-modified group=3.0 wt %
(E-2) Maleic anhydride-modified polypropylene (Youmex 1010, manufactured by Sanyo Chemical Industries, Ltd.)
[η]=0.28 dl/g (135° C., measured in Tetralin), the amount of a maleic acid-modified group=4.5 wt %
Component (F): Lubricant
Erucamide (Neutron S, manufactured by Nippon Fine Chemicals)
Other Additives 0.1 part by weight of Irganox 1010 (manufactured by BASF, Japan, Ltd.) and 0.1 part by weight of Irgafos 168 (manufactured by BASF, Japan, Ltd.) as an antioxidant, 0.2 part by weight of LA-52 (manufactured by Adeka Corporation) as a light stabilizer, 0.1 part by weight of calcium stearate (manufactured by NOF Corporation) as a dispersant and 6 parts by weight of a black pigment (MBPPCM 802Y-307, manufactured by Tokyo Printing Ink Mfg. Co., Ltd.) were mixed.

From Tables 2 and 3, it can be understood that the composition and the molded product obtained in Examples have excellent Charpy impact strength, tensile elasticity, generation of flow marks, low gloss property and scratch resistance.

INDUSTRIAL APPLICABILITY

A molded product obtained by molding the resin composition of the invention can be used in an interior material (instrumental panel, pillar, door trim, or the like) or the like. The molded product of the invention is almost free from flow marks or the like, and has excellent low gloss property and scratch resistance. Therefore, it can be used as a product without providing a post treatment such as painting or lamination of outer layers.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification are incorporated herein by reference in its entirety.

The invention claimed is:

1. A polypropylene-based resin composition comprising 100 parts by weight of the following component (A), 18 parts by weight or more and 65 parts by weight or less of the following component (B), 6 parts by weight or more and 45 parts by weight or less of the following component (C), 25 parts by weight or more and 60 parts by weight or less of the following component (D), 0.1 part by weight or more and 6.5 parts by weight or less of the following component (E) and 0.15 part by weight or more and 5.0 parts or less by weight of the following component (F):

(A) a propylene-ethylene block copolymer A satisfying the following (a1) to (d1):
  (a1) the amount of a room temperature decane-soluble part is 8 wt % or more and 35 wt % or less;
  (b1) the room temperature decane-soluble part has a limiting viscosity [$\eta$] of 1.0 dl/g or more and 10.0 dl/g or less;
  (c1) the amount of ethylene in the room temperature decane-soluble part is 33 mol % or more and 48 mol % or less;
  (d1) the melt flow rate (MFR: 230° C., under the load of 2.16 kg) is 20 g/10 min or more and 100 g/10 min or less;
(B) A propylene-ethylene block copolymer B satisfying the following (a2) to (d2):
  (a2) the amount of a room temperature decane-soluble part is 16 wt % or more and 35 wt % or less;
  (b2) the room temperature decane-soluble part has a limiting viscosity [$\eta$] of 5.0 dl/g or more and 10.0 dl/g or less;
  (c2) the amount of ethylene in the room temperature decane-soluble part is 36 mol % or more and 49 mol % or less;
  (d2) the melt flow rate (MFR: 230° C., under the load of 2.16 kg) is 1 g/10 min or more and less than 20 g/10 min;
(C) an ethylene-$\alpha$-olefin copolymer having a melt flow rate (230° C., under the load of 2.16 kg) of 0.5 g/10 min or more and 20 g/10 min or less;
(D) an inorganic filler having an average particle diameter of 1 μm or more and 14 μm or less;
(E) an acid-modified polypropylene; and
(F) a lubricant.

2. The polypropylene-based resin composition according to claim 1, wherein the amount of the room temperature decane-soluble part of the component (A) is 8 wt % or more and 28 wt % or less.

3. The polypropylene-based resin composition according to claim 1, wherein the room temperature decane-soluble part of the component (A) has a limiting viscosity [$\eta$] of 2.0 dl/g or more and 8.5 dl/g or less.

4. The polypropylene-based resin composition according to claim 1, wherein the amount of the component (B) is 20 parts by weight or more and 50 parts by weight or less.

5. The polypropylene-based resin composition according to claim 1, wherein the room temperature decane-soluble part of the component (B) has a limiting viscosity [$\eta$] of 6.5 dl/g or more and 8.5 dl/g or less.

6. The polypropylene-based resin composition according to claim 1, wherein the melt flow rate (230° C., under the load of 2.16 kg) of the component (A) is 25 g/10 min or more and 95 g/10 min or less.

7. The polypropylene-based resin composition according to claim 1, wherein the melt flow rate (230° C., under the load of 2.16 kg) of the component (B) is 10 g/10 min or more and 18 g/10 min or less.

8. The polypropylene-based resin composition according to claim 1, wherein the melt flow rate (230° C., under the load of 2.16 kg) is 10 g/10 min or more and 45 g/10 min or less.

9. The polypropylene-based resin composition according to claim 1, wherein the inorganic filler (D) is talc.

10. The polypropylene-based resin composition according to claim 1, wherein the lubricant (F) is an aliphatic acid amide.

11. A molded product obtained by molding the polypropylene-based resin composition according to claim 1.

12. The molded product according to claim 11 which is used for an instrumental panel of an automobile.

* * * * *